US005090972A

United States Patent [19]

Eller et al.

[11] Patent Number: 5,090,972

[45] Date of Patent: * Feb. 25, 1992

[54] PARTICULATE ABATEMENT AND ENVIRONMENTAL CONTROL SYSTEM

[75] Inventors: Joe C. Eller; James E. Leavens; Charles H. Wyatt, all of Houston, Tex.

[73] Assignee: Enviro-Air Control Corporation, Houston, Tex.

[ * ] Notice: The portion of the term of this patent subsequent to Apr. 2, 2008 has been disclaimed.

[21] Appl. No.: 651,596

[22] Filed: Feb. 6, 1991

Related U.S. Application Data

[63] Continuation of Ser. No. 514,092, Apr. 25, 1990, Pat. No. 5,004,483.

[51] Int. Cl.[5] .............................................. B01D 46/54

[52] U.S. Cl. .......................................... 55/20; 55/21; 55/80; 55/213; 55/217; 55/318; 55/356; 55/472; 55/385.2; 454/49; 454/187; 454/236; 454/238; 134/111

[58] Field of Search ................. 55/20, 21, 80, 97, 213, 55/217, 315, 318, 356, 345.2, 385.4, 467, 472; 98/15, 34.5, 34.6; 134/110, 111, 201

[56] References Cited

U.S. PATENT DOCUMENTS

| | | | |
|---|---|---|---|
| 3,963,461 | 6/1976 | Stockford et al. | 55/50 |
| 4,544,380 | 10/1985 | Itou et al. | 55/80 |
| 4,604,111 | 8/1986 | Natale | 55/97 |
| 4,732,592 | 3/1988 | Spengler | 55/356 |
| 4,774,974 | 10/1988 | Teter | 134/110 |
| 4,801,312 | 1/1989 | Maxeson | 55/97 |
| 5,004,483 | 4/1991 | Eller et al. | 55/20 |

OTHER PUBLICATIONS

Article "Red Baron's Develops No-Fee Air Filter System No U.S. Patent Infringement," Dec. 1989.
Article "The Brand Method Revisited," Jun. 1987.
Article "By William 'Chip' D'Angelo," Jul./Aug. 1989.
Article "Red Baron New Hepa-Vent," undated.
Brochure entitled "Airdex Dehumidification Industrial Service," Nov. 14, 1988.

*Primary Examiner*—Charles Hart
*Attorney, Agent, or Firm*—Browning, Bushman, Anderson & Brookhart

[57] ABSTRACT

Improved techniques are provided for improving the environment of hazardous material abatement personnel operating within an enclosed working area while conducting, for example, asbestos removal operations. A negative pressure is established within the working area by a portable air moving unit, which exhausts air from the working area to prevent hazardous material leakage. The exhausted air is filtered, a significant portion of the exhausted air is conditioned by a portable refrigeration, heating and dehumidification system, and the temperature controlled air is returned to the working area. An air diverter is provided for regulating the ratio of the discharged air to the returned and conditioned air in response to the sensed pressure level within the working area. The temperature of the working area is regulated, thereby substantially increasing worker productivity and reducing safety risks. The humidity level within the working area may either be lowered to reduce the curing time for hazardous material final encapsulation operations, or increased to reduce the airborne contaminant level during wet abatement operations. Leakage from the working area is preferably minimized, while the efficiency of the portable conditioning unit is maximized.

20 Claims, 2 Drawing Sheets

PARTICULATE ABATEMENT AND ENVIRONMENTAL CONTROL SYSTEM

This is a continuation of application Ser. No. 07/514,092, filed Apr. 25, 1990, U.S. Pat. No. 5,004,483.

BACKGROUND OF THE INVENTION

1. Field of the Invention

The present invention relates to systems for controlling the workplace environment and, more particularly, relates to improved methods and apparatus for reducing the level of airborne particulate while increasing the comfort level of the working environment maintained at a pressure of slightly less than atmospheric pressure during operations involving the removal of hazardous material, such as asbestos or lead-based paint.

2. Description of the Background

Various systems have been devised to reduce workers' exposure to contaminants in the air while conducting operations which inevitably generate airborne particles. When such operations are part of a manufacturing process, permanent air ventilation, filtration, and exhaust systems are typically provided for efficiently reducing the airborne contaminant exposure to workers or operators. Special problems are presented, however, when high airborne contaminant levels occur in a workplace environment for relatively short periods of time, e.g., for only several days or weeks. As a practical matter, systems designed to reduce worker exposure at such work sites are typically portable, and are designed with little if any consideration to factors commonly considered when designing permanent air filtration installations. In many cases, workers exposed to hazardous airborne contaminants at differing work sites are provided with portable respirators which achieve adequate filtration of particles from the air inhaled by the worker, although the portable respirator may be cumbersome and impede the worker's performance.

A particularly troublesome problem is presented for workers performing operations including the removal or encapsulation of hazardous airborne contaminates, such as asbestos, from existing buildings. Asbestos fibers have long been known to cause significant health risks if inhaled, and accordingly protective equipment must be highly effective. Building asbestos abatement operations obviously are performed at different sites, and the building designs, asbestos containing materials, and the location of asbestos within the buildings widely vary. In spite of these difficulties, billions of dollars are spent annually and will continue to be expended to remove asbestos and similar contaminates from schools, offices, manufacturing plants, etc. in order to reduce the risks to personnel who daily occupy such buildings. Asbestos removal operations necessarily increase significantly the level of airborne asbestos fibers during the removal and cleanup procedure, and a significant amount of research and development has already been expended to devise systems to safeguard asbestos abatement workers. While such systems include protective suits, ventilators with portable air tanks, and other individualized equipment worn or carried by the workers, such safety equipment substantially reduces the dexterity and productivity of the worker and increases overall costs. Less cumbersome individualized safety equipment requires that airborne contamination levels at the workplace be substantially reduced so that any exposure to the workers will satisfy established guidelines. Moreover, such individualized equipment fails to satisfy the desire that hazardous airborne contaminants not leak from the work site.

U.S. Pat. No. 4,604,111 discloses a system for maintaining negative (less than atmospheric) pressure in an enclosure during asbestos removal operations by exhausting filtered air outside the substantially sealed workplace environment. This negative air system offers the advantage of reducing the likelihood that harmful fibers will escape the substantially sealed enclosure, since any leakage of air is inward toward the lower pressure within the workspace. Accordingly to the '111 patent, a flow path is established to allow outside air to intentionally leak into the substantially enclosed workspace, and this flow path is sealed by a flap seal of plastic sheeting to prevent air from exiting the enclosed space in the event of a loss of negative pressures.

Other systems have been devised which do not use the flap seal design described above. A HEPA-VENT system offered by Global Consumer Services utilizes self-closing solid doors to obtain worker access to an enclosed work area. The system filters makeup air which enters the enclosure, and also filters air from the enclosure if positive pressure were to build up within the enclosed workspace.

U.S. Pat. No. 4,801,312 discloses a system which establishes uniform airflow through the enclosed workspace to remove airborne particles from the worker's breathing zone. Air from the enclosed workspace is filtered by units positioned midway within the enclosed space, and the flow path between the inlet and outlet of these units remains within the enclosed space.

In spite of the advances made to date, significant problems remain for workers performing asbestos removal and cleanup operations within substantially enclosed workspaces. In most cases, a building in which asbestos abatement operations are conducted has a permanent heating, cooling, and ventilation system. This system cannot be operated during asbestos abatement operations, or the partially operated system must be completely isolated from the workspace where such asbestos abatement operations are occurring. The justified concern is that hazardous airborne particles may enter and contaminate the permanent building ventilation system, which could re-expose cleaned areas to contaminants and subject personnel without protective equipment to asbestos fibers for long periods of time.

Standard practice in the asbestos abatement industry is to define a contaminated working zone and avoid any system which exhausts contaminated air and circulates previously contaminated air back into the working zone. Permanent ventilation and air-conditioning systems typically use at least some outside air makeup, and their use during abatement operations would also defeat the objective of sealing off the enclosed area and maintaining a negative pressure within the enclosed space. A number of filtration and exhaust units are typically used to maintain negative pressure within the enclosed workspace, and the benefit of these units would be reduced by a system which added outside air to the enclosed space and thus tended to create a positive pressure within the defined working space.

Asbestos abatement personnel have long performed removal and cleanup operations under adverse temperature and humidity conditions. For example, personnel frequently are conducting operations in enclosed spaces where the temperature either exceeds 100° F. or is less than 50° F. Adverse environmental conditions substantially reduce the operator's productivity, especially when one considers the added burden on the operator attributable to protective clothing and required respiratory equipment. Moreover, asbestos abatement operations frequently involve water spraying techniques which substantially increase the humidity level in the enclosed space. Asbestos may be removed from pipes, ceilings, etc. by a high pressure water spray to reduce the level of airborne asbestos fibers or friable count compared to many "dry" removal techniques. Asbestos may also be encapsulated rather than removed by spraying a sealant over the asbestos containing material, as explained more fully below. Due to these temperature and humidity conditions, asbestos abatement operators frequently work in the enclosed space for relatively short time periods. As an example, an operator may don his protective clothing and respirator in a special clean changing area, enter the enclosed asbestos removal area, perform removal, cleanup or sealing operations for 20 or 30 minutes, return to a dirty changing area to remove his protective clothing, enter an adjoining shower area to rinse off any asbestos particles, continue to the clean changing area, rest outside the enclosed area for 15 minutes, then repeat the process.

The above described procedure substantially reduces the operator's productivity due to the long time required for operator preparation, cleanup, and rest. A great deal of expense is also incurred in the purchase and proper disposal of the operator's protective equipment, since the equipment is typically discarded after each use. Moreover, the operator's productivity within the work area is relatively poor, even though he is working at his peak output, due to the combination of the protective equipment and the adverse temperature and/or high humidity environment. The rest time required for the operator due to high fatigue when working within the enclosed place is thus only part of the reason for the overall poor productivity and high cost for the asbestos abatement operator. As a result of his poor working environment, frustrated asbestos abatement operations have been known to disregard proper safety procedures, e.g., by removing or short circuiting respiratory equipment to increase their productivity within the enclosed space. This practice not only violates governmental regulations, but more importantly subjects the worker, and indirectly his employer, to substantial safety risks and litigation.

Some asbestos abatement procedures do not require the removal of all the asbestos, but rather may seal or encapsulate some of the remaining asbestos in place with a liquid sealant. After the majority of the asbestos has been removed from a working space, preferably using a wet removal technique to maintain a low friable count of fibers, a "skin layer" of remaining asbestos or asbestos remaining in thin cracks or crevices may be sealed in place using a "lock down" procedure. Typically three or more coatings of sealant or "lock down" must be sprayed on the remaining asbestos containing material, and each coating must cure prior to applying the next coat. The high humidity within the enclosed space results in long curing times, and operators typically return each day to apply a new coat over the coating sprayed the previous day. This long curing time results in increased personnel and equipment costs, which again substantially increases the overall cost of this procedure.

Although the above described problems have long been known in the asbestos abatement industry, no practical solution has heretofore solved these problems. As a result, the productivity of asbestos abatement workers remains very low, and the cost of providing and disposing of protective equipment is high. Building owners are justifiably concerned about asbestos contamination, but are also concerned about asbestos abatement procedures which may contaminate areas in buildings which previously did not contain asbestos. Abatement contractors and building owners are also justifiably concerned about safety shortcuts and litigation.

A related problem concerns the removal or abatement of hazardous particulate material from outdoor structures and components. While the working space within a building is typically partially formed by creating a temporary wall or barrier, the entire working zone may be defined by such temporary barriers while removing asbestos, for example, from outdoor pipes supported on conventional pipe racks. Successive lengths of the pipe lines may be enclosed with plastic sheeting and negative pressure maintained while conducting the asbestos abatement operation, although the adverse temperature and uncontrolled humidity within this working space again lead to low worker productivity and high curing times for lock down operations.

A growing problem concerns the working environment when removing lead-based paint from either indoor or outdoor structures. Lead-based paint can be removed from bridges, tanks, petrochemical towers, and similar structures using blasting operations. The working environment for the blasting operators may be enclosed with a temporary barrier to reduce the contamination of adjoining areas. While this contamination may be at least substantially eliminated by creating a slight negative pressure within the temporary enclosed working space, the elevated temperature and high humidity within the enclosed space, when coupled with the burden of individualized protective equipment and low air flow, inherently creates low worker productivity and the tendency for the blasting operators to avoid proper safety procedures or equipment.

The disadvantages of the prior art are overcome by the present invention, and improved techniques are hereinafter disclosed for removing airborne particulate from a workplace area while increasing the worker's comfort level and thus the productivity of the asbestos abatement personnel.

SUMMARY OF THE INVENTION

According to a preferred technique, a working space or zone within a portion of a building or an enclosed working zone outside a building is at least substantially sealed in an air-tight manner. Particular care is preferably taken to minimize air leakage into the enclosed working space. A portable blower and filtration unit is provided for exhausting air from the enclosed space to maintain a negative pressure of about 0.02" of water. Airborne contaminates are filtered from the exhausted air by a high efficiency particulate air filter. A majority, and preferably at least 80%, of the exhausted air is input to a portable conditioning unit, which receives all or substantially all of its incoming air from the blower and filtration unit. The portable conditioning unit may include a refrigeration unit for lowering the temperature of the air, a heating unit for raising the air temperature, and a dehumidification unit for removing moisture from the air. The dehumidification unit preferably operates in conjunction with the refrigeration unit to cool the air to a temperature below its dew point, so that water vapor condenses on the cooling coils and is removed by a drain line. If desired, the cooled air may be reheated by a heating coil. The temperature controlled and dehumidified air is returned to the enclosed working space, preferably at a location substantially opposite the blower and filtration unit.

A pressure sensor is provided for continually monitoring the pressure level within the enclosed space relative to the ambient pressure outside the space. An air diverter or dampener is placed between the blower/filtration unit and the conditioning unit for controlling the amount of filtered air which is exhausted relative to that input to the conditioning unit. The diverter unit is operatively controlled in response to the pressure sensor. If sensed negative pressure drops to a preselective level, e.g., 0.04" of water, the damper increases the air flow to the conditioning unit and reduces exhausted air. Conversely, if sensed air pressure rises above a high set point, e.g, 0.01" of water, more air is exhausted and less air returned to the enclosed space. If the air pressure within the enclosed working space rises above a safety set value, e.g., 0" of water or ambient pressure, the entire system may be automatically shut down. Operation of the refrigeration, dehumidification, and heating unit is controlled by appropriate sensors within the enclosed space. Condensate from the refrigeration unit may be returned to a liquid tank for intermittently conducting water spraying during wet removal pressures, or may be added to the returned air to increase the humidity within the enclosed space. The cool water reduces the heat load added to the enclosed space, and thus reduces the cost of operating the conditioning unit to maintain the desired temperature within the enclosed space.

It is an object of the present invention to provide an improved system for controlling the airborne contamination level and comfort level of workers in a temporary enclosed working space.

It is a further object of this invention to provide improved portable apparatus for maintaining negative air pressure within an enclosed working space while preventing hazardous airborne contaminates from leaking out the enclosed space. The portable apparatus includes means for exhausting air from the enclosed space, conditioning a substantial portion of the exhausted air, and returning the conditioned air to the enclosed space.

It is a feature of the present invention that air exhausted from an enclosed working space for conducting asbestos abatement operations is filtered to remove asbestos fibers, that the temperature and humidity of the filtered air is modified before the air is returned to the enclosed space, and that the ratio of the returned air to the exhausted air is adjusted as a function of the pressure within the enclosed space.

It is another feature of the invention to provide a system including a first blower for withdrawing and filtering air from a temporary asbestos abatement enclosure to maintain a negative air pressure within the enclosure, and a second blower for returning conditioned air to the enclosure which first passed through the first blower.

Yet another feature of the present invention is that the humidity level within the working space may be maintained at a desired level by lowering the temperature of the air below its dew point to remove water vapor from the air. The humidity level may intentionally be raised when conducting wet asbestos removal operations to reduce the friable count of asbestos fibers within the enclosure, and may subsequently be lowered to reduce both the time required to dry out materials after the wet removal operation, and the curing time for sealants applied during lock down operations. Also, the intentional lowering of the humidity level within the working space may increase the worker's comfort when conducting dry asbestos removal operations, and may similarly increase comfort during cleanup and final sealing operations.

A significant advantage of the present invention is that the comfort of abatement personnel working within a substantially enclosed space may be substantially increased without significant consumption of energy to maintain the desired comfort level.

A further advantage of the present invention is that abatement personnel may operate efficiently for extended periods of time within a temporary enclosed space, thereby improving productivity and reducing the cost of protective equipment.

Yet another advantage of this invention is that minor amounts of air leakage into the temporary enclosed working space do not adversely affect the comfort level of asbestos abatement personnel.

Another advantage of the invention is that safety devices are provided to avoid the buildup of positive pressure within the enclosed working space.

It is another advantage of the present invention that the system substantially reduces the curing time for sprayed sealants applied over asbestos containing materials within a temporary enclosed space, thereby reducing labor costs and the time required to conduct asbestos abatement operations.

These and further objects, features, and advantages of the present invention will become apparent from the following detailed description, when reference is made to the figures in the accompanying drawings.

DETAILED DESCRIPTION OF THE PREFERRED EMBODIMENTS

Figure 1:
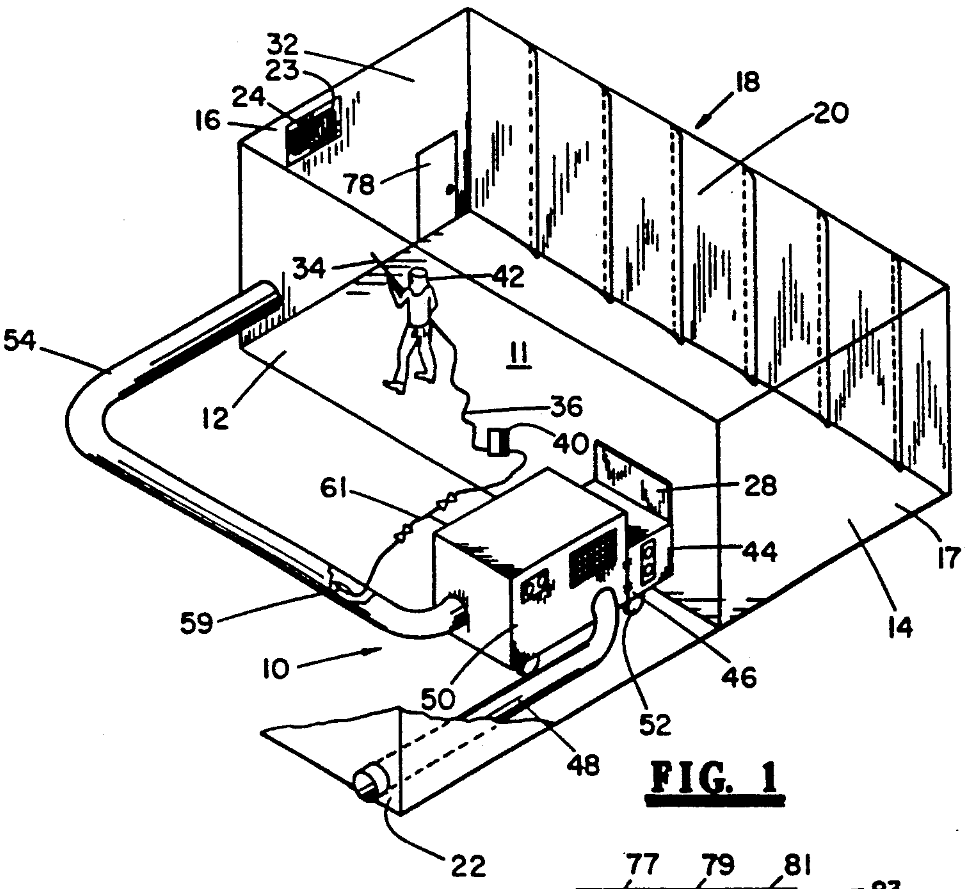
FIG. 1 is a simplified pictorial view a particulate abatement and environmental control system according to the present invention.

FIG. 1 depicts a system according to the present invention for reducing the airborne particulate contaminant level in a working area or zone of an existing building. The system according to the present invention maintains a negative pressure within the working area (with respect to the "ambient" pressure outside the working area), and creates a relatively comfortable working environment for the abatement personnel by regulating the temperature within the working area. By creating this environment, the productivity of the abatement personnel is substantially increased, while the health risks and safety equipment costs are reduced. It should be understood that the working area is a space temporarily established for conducting the particulate abatement operations, and typically will be a portion of the area within an existing building, such as a school, manufacturing plant, office complex, shopping center, etc. The techniques for the present invention are particularly well suited for increasing the productivity of workers conducting asbestos abatement operations, during which asbestos is found along pipes, in the ceiling tile, in wall insulation, etc., is either removed from the working area by a wet or dry process well known in the industry and/or is encapsulated by spraying layers of liquid sealants over the asbestos-containing material. The techniques and apparatus of this invention may also be used to maintain a comfortable and thus productive working environment for blasting operations removing lead-based paint from outdoor structures temporarily enclosed with barrier walls to minimize contamination. Although the invention is hereinafter described for conducting asbestos abatement operations, it should be understood that the concepts and apparatus of the present invention may be used in conjunction with abatement operations which generate various solid airborne contaminants, and particularly hazardous contaminants, within a temporary working area.

The apparatus 10 of the present invention is used to temporarily create a controlled environment within a working area or zone 11 defined by permanent interior walls 12, 14 and 16, permanent floor 17, and ceiling 32 within an existing building. The temporary space 11 is initially formed by the asbestos abatement workers or other contractors, and its form finalized by a temporary wall 18. Temporary wall 18, in turn, is conventionally formed by hanging layers of overlapping polyethylene sheets 20 or "flaps" as described in U.S. Pat. No. 4,604,111, from the ceiling 32. Those skilled in the asbestos abatement art appreciate that asbestos or other particulate which may become airborne within a building may be removed from or permanently sealed within the building to prevent the material from subsequently becoming airborne. This process typically takes place by sequentially creating working areas within the building using, when possible, existing walls, floors, and ceilings. The typical working area or zone for conducting asbestos abatement operations has a volume of from 20,000 to 40,000 cubic feet.

The permanent and temporary walls, floors, and ceiling thus define a substantially sealed area within a portion of the building, which includes an exemplary exterior wall 22. Those skilled in the abatement art appreciate that air ducts which form a part of a permanent ventilation system for the building should be isolated from the working space prior to conducting any asbestos abatement operations. Accordingly, an exemplary ventilation grill 23 is covered with a plastic sheet 24 taped to the wall 16 prior to conducting any abatement operations within the working area 11. The working area may also be defined by one or more permanent access doors 78. As depicted in FIG. 1, one of the access doors has been conveniently removed, and the portable apparatus 10 installed so that its air intake occupies a portion of the door opening. The air intake of the portable unit 10 may be sealed to the wall 12 with duct tape or other conventional sealing material, and any large areas may be sealed by a small piece of plastic sheeting 28. Alternatively, a desired sized hole for the air intake of the unit 10 may be cut or otherwise formed within a temporary or permanent wall which defines the working space. It should be understood that the unit 10 is portable, and is thus provided with casters or rollers 52. This allows the unit 10 to be easily moved within the building between sequentially formed temporary working areas, and also outdoors from one job site to another. Although FIG. 1 depicts the entirety of unit 10 exterior of the working area 11, a portion of the unit 10 may be physically located within the working area 11.

An asbestos worker is shown within the working area 11 in FIG. 1, and has conventional protective clothing and a ventilation hood 42 or other individualized ventilation or respiration device for insuring that the worker inhale air within acceptable safety limits. The illustrated worker is depicted operating a conventional portable spray gun 34 to apply water to the walls and ceiling, which is a process intermittently used during wet asbestos removal operations to reduce the amount of airborne fibers. A flexible hose 36 connects gun 34 to water storage 40. It should also be understood that the gun 34 may be supplied with a mixture of water and a selected sealant from another storage tank (not depicted) for conducting lock-down operations. Also, the space 11 is substantially sealed, although some air may leak into the space 11 between the flaps 20 or through other leak points through the barrier walls due to the slight negative pressure of approximately 0.02" of water which is preferably maintained within the temporary enclosure 11.

The apparatus 10 includes a filtration unit 44 and a blower unit 46, which together may form a unit similar to a conventional "negative air" unit as described in U.S. Pat. No. 4,604,111. A portion of the air exhausted from the negative air unit may be discharged, as explained subsequently, although most of the exhausted air is input directly to the conditioning unit 50, which preferentially includes a refrigeration, heating and dehumidification system. As illustrated in FIG. 1, exhausted air flows through air duct 48 and may be discharged through the exterior wall 22 to outside the building. Conditioned air is returned by duct 54 to the working area 11 to maintain the temperature within the working area within a comfortable range, and to maintain a desired humidity level within the enclosed space. Unit 10 is portable, reasonably sized, electrically powered, and preferably is of a particular type, as explained subsequently. Unit 10 may be powered by direct connection to a 230 volt outlet within the building, or may be powered by a separate generator (not shown). It should be understood that ducts 48 and 54 are temporary air ducts and are not part of the permanent building ventilation system, and accordingly these ducts may be flexible air ducts.

Figure 2:
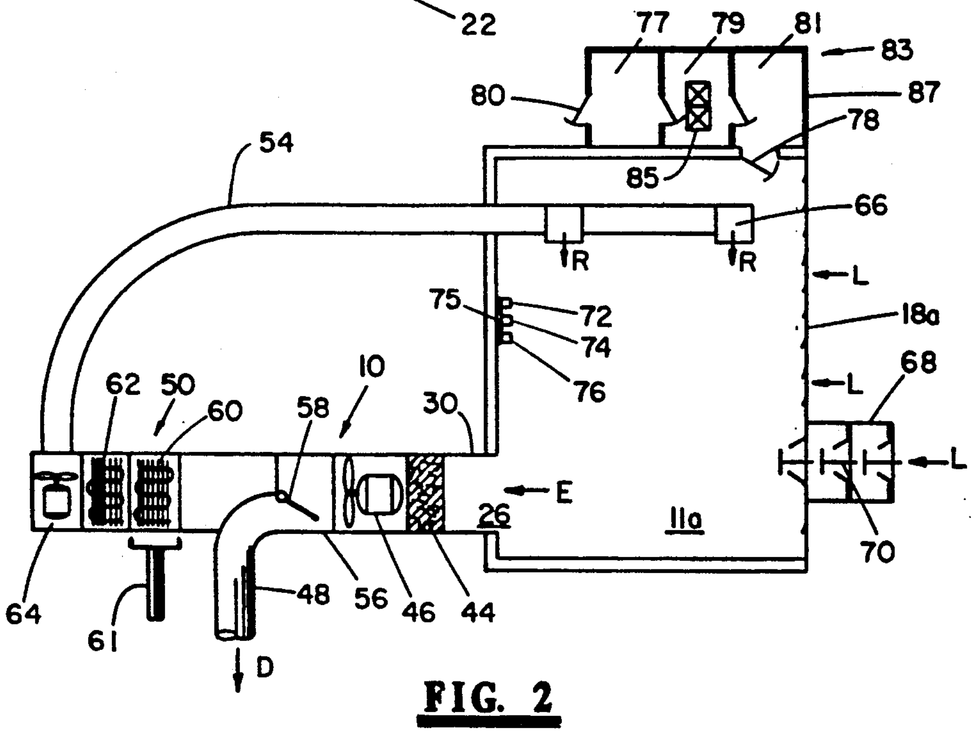
FIG. 2 is a simplified floor plan illustrating various decontamination areas, personnel and equipment passageways, and the flow path of air through the temporary enclosure and system of the present invention.

FIG. 2 depicts another embodiment of the present invention, wherein the unit 10 is conditioning the air within the enclosed space 11*a* defined in part by temporary wall 18*a*. A connecting duct 30 is provided for establishing fluid-tight communication between the working area and the unit 10 through doorway opening 26. The filter unit 44 is generally depicted, although preferably the filter unit consists of three separate filter media which together comprise a high efficiency particulate air filter, or HEPA filter. The blower unit 46 includes an electrically powered motor for driving a fan or blower, which pulls or draws air through the filter 44.

A transition air duct 56 includes a diverter or baffle 58 which divides the exhausted air from the negative air unit into air discharged through duct 48 and air which flows directly to the conditioning unit 50. The position of the diverter 58 is preferably controlled by a powered controller or motor and a linkage assembly (not depicted in FIG. 2) interconnecting the controller and the diverter, which together regulate the ratio of the discharged air to the conditioned air. According to the present invention, this ratio is at least 1:3, and preferably at least 80% of the air exhausted from the enclosed space is input directly to the air conditioning unit 50. The amount of exhausted air is a function of the amount of air which leaks into the enclosed space, as disclosed hereafter. The conditioning unit 50 includes an evaporation coil 60 which cools the air to a temperature below its dew point, such that the air is cooled and moisture in the air simultaneously condenses on the coil 60 and it is removed via condensate line 61. The conditioning unit 50 may also include an air stream condenser coil 62, which reheats the dehumidified air to a desired temperature utilizing heat recaptured from the dehumidification process.

According to one embodiment of the present invention, a condensate line 61 is connected to container 40, so that relatively cool condensate (typically between 35° F. and 55° F.) is input to the spray gun during the "wet" asbestos abatement operation. Alternatively, the cool condensate may be sprayed as a fine mist from atomizer unit 59 within the return air duct 54 to maintain a high humidity level within the working space. This substantially reduces the heat load to the enclosed space compared to systems which use room temperature water for these spraying operations, thereby increasing the ability of the unit 10 to maintain the desired temperature within the working area with reduced power consumption. By maintaining a high humidity level within the enclosure during wet asbestos abatement operations, the friable fiber count may be maintained at a desired low level, thereby reducing worker exposure and loading on the filter units. As another feature of the present invention, a second blower 64 is preferably provided downstream from the coils 60 and 62, and serves to draw or pull air through the coils then discharge the temperature controlled and dehumidified air back to the working area. The utilization of the second air blower substantially increases the efficiency of the first blower. Tests have indicated that a typical negative air unit rated, for example, at 2,000 CFM actually pulls much less than 2,000 CFM through the filter unit and out the discharge duct when conducting asbestos abatement operations. According to the present invention, blower 64 operates in series with blower 46. The back-pressure on the blower 46 is minimized by the blower 64, so that blower 46 working in conjunction with blower unit 64 is able to exhaust substantially the level of its rating from the working area 11.

FIG. 2 also illustrates that the conditioned air may be discharged into the working area 11*a* through one or more temporary air grills 66, preferably at a position to minimize the airborne contaminant level to the operators, and to establish a uniform air flow through the working area. Typically grills 66 are positioned at the end of the working area opposite the exhaust opening 26, and may be adjusted to direct conditioned air directly toward the operators. As explained subsequently, the operation of the baffle unit 58 is controlled in response to negative air pressure within the working area. Also, the conditioning unit 50 as discussed below is controlled by temperature and humidity sensors within the working area. FIG. 2 thus illustrates a monitoring panel 75 temporarily mounted within the working area at a position which is generally indicative of the environment for the workers. The monitoring panel 75 includes a negative pressure sensor 72, an air temperature sensor 74, and a humidity sensor 76. Preferably the conditioning unit 10 returns a sufficient volume of filtered and conditioned air to the working area to achieve, in conjunction with the air which leaks into the working area, at least four air changes per hour. In other words, if the working area 11*a* has a volume of 30,000 cubic feet, and the negative air pressure maintained within the enclosure results in 300 CFM leaking into the enclosure, the unit 10 will deliver at least 1,700 CFM (2,000 CFM less 300 CFM) back to the working area.

FIG. 2 also illustrates a worker decontamination area which is adjoining but is external to the working area. The decontamination area 83 is formed by temporary walls 87 which define a clean room area or rest area 77, a shower area 79 including a plurality of showers 85, and a decontamination or changing area 81. A solid door 80 may be provided between each of these areas, so that very little if any air leakage into the working area 11*a* flows through the decontamination area 83. FIG. 2 also illustrates an alternative worker access into the area 11*a*, which optionally may be used as an emergency worker egress or used as a pathway for carrying sealed bags of asbestos from the working area. A plurality of temporary chamber 68 are provided for obtaining entry through the temporary wall 18*a*, and each chamber may include a conventional seal flap 70 to minimize air leakage into the working area, as disclosed in U.S. Pat. No. 4,604,111.

The techniques of the present invention are designed to maintain a desired negative pressure within the enclosed working area, while also returning a substantial portion of the exhausted air back to the working area after this air is first filtered and conditioned. All or substantially all conditioned air thus first passes through the filter unit 44. Since negative pressure exists within the working area, some air will inevitably leak from outside into the working area. According to the present invention, however, the amount of air leakage into the working area is substantially minimized, which is dissimilar to prior art asbestos abatement systems which intentionally allowed large amounts of leakage air into the working area. Referring again to FIG. 2, the worker decontamination area 83 may allow little or no air leakage into the working area, so that, if all the barrier walls which define the working area are permanent, or if solid temporary walls are formed from a wooden frame and plastic sheeting which did not allow air entry into the working area, very little leakage (less than about 100 CFM) into the working area is obtained with a negative pressure of about 0.02" of water. Even if a temporary wall 18*a* is utilized and/or the flap design and worker access through flap seals 70 is used as shown in FIG. 2, the amount of air represented by L in FIG. 2 is minimal, and is desirably less than about 600 CFM, and preferably less than about 300 CFM. According to the present invention, the amount of leakage air into the working area is preferably less than one percent (1%) per minute of the volume of the working area, although a desired negative pressure of 0.02" of water is maintained within the working area. This air leakage is substantially less than that allowed or desired according to prior art asbestos abatement operations, and contributes to the ability of the air conditioning unit 10 to maintain a desirable environment utilizing low energy and a relatively small air conditioning unit.

The amount of air exhausted from the enclosed area 11*a* by the blower 46 is represented by E in FIG. 2, and the discharged air D and the returned air R are also schematically illustrated. According to the present invention, E=D+R, since preferably no "outside air" is input to the conditioning unit 50. It should be understood that the amount of discharged air D need only be equal to the leakage air L to maintain the working area at a desired negative pressure and yet supply temperature controlled and dehumidified air to the workers. Since L is preferably minimized, D may be less than 20% of E, and the portable conditioning unit 50 may operate at a surprisingly efficient level for environmental conditioning of previously asbestos contaminated air.

Figure 3:
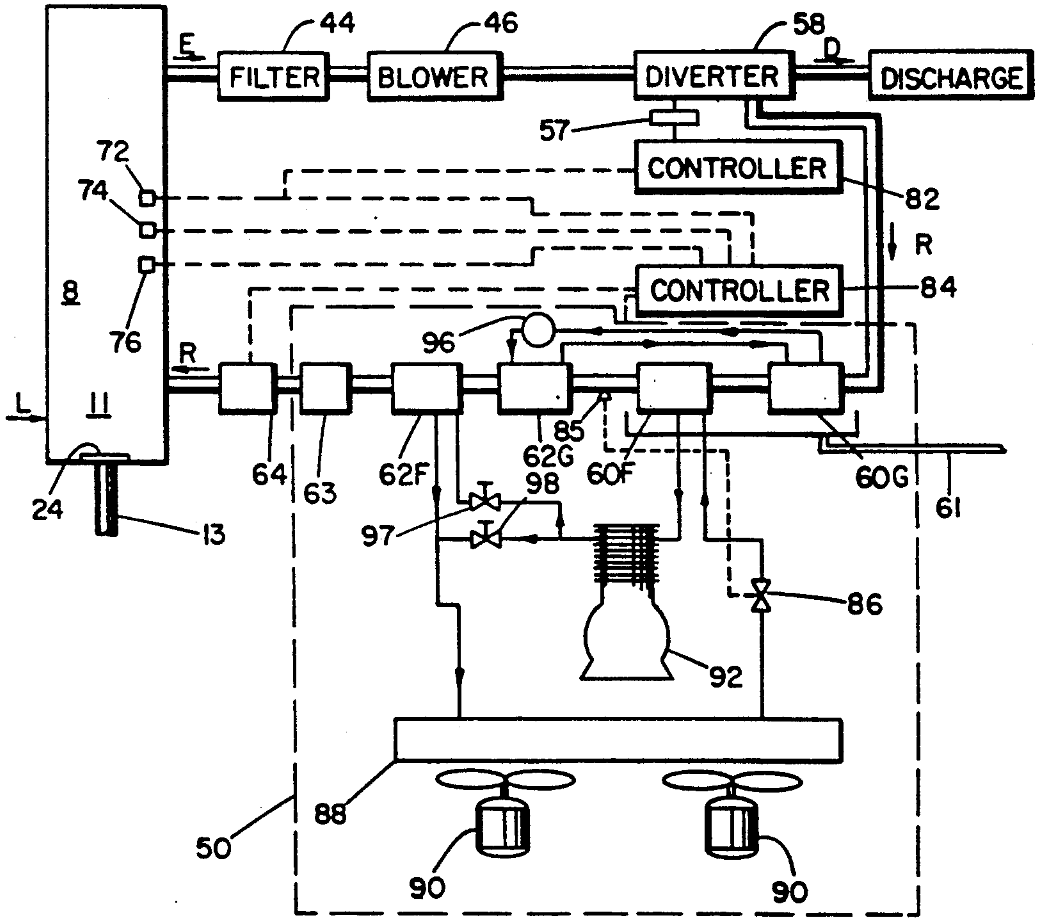
FIG. 3 is a block diagram of the particulate abatement and environmental control system as generally shown on FIG. 1.

FIG. 3 is a block diagram and simplistic pictorial illustration of the apparatus disclosed above for maintaining a negative pressure within the working area 11 while returning conditioned air to the working area. As previously noted, a permanent air supply or exhaust duct 23 is sealed from the working area by plastic sheeting 24. Exhausted air is drawn through filter 44 by blower unit 46, and the exhausted air E is separated by diverter 58 into discharged air D, which preferably is exhausted outside the building, and conditioned and returned air R. The controller 82 regulates the position of diverter 58 in response to negative air sensor 72 within the working area. Controller 82 may include preselected actuation limits for causing incremental movement of the diverter to change the ratio of discharged to returned air. For example, if 0.02" of negative pressure is ideally desired within the working area 11, a lower limit of 0.03" of water and an upper limit of 0.01" of water may be selected. In response to the sensor 72, the controller 82 thus activates a drive unit 57 which incrementally moves the diverter 58 to decrease the amount of discharged air when the lower limit is reached, and similarly increases the amount of discharged air if the upper limit is reached. Alternatively, the controller 82 may automatically operate the diverter continuously to maintain a "steady state" condition of 0.02" of negative pressure within the working area. Also, a safety limit, e.g., 0" of water, may be selected to cause controller 84 to terminate the power to the blower 64 if a negative pressure is not maintained within the working area, so that no air is forced through the duct 54 back into the working area. The ducts 48 and 54 need not be sealed, however, since any air discharged from the working area or returned to the working area first passes through the filter 44.

The conditioner 50 is preferably of a type which utilizes a compression/expansion cooling system, including a compressor 92, expansion valve 86, and an evaporation coil 60F. Air thus flows through the evaporation coil 60F, and is cooled by a refrigerant, such as Freon, which flows in a closed loop from the compressor 92, through the ambient air condenser 88, to the expansion valve 86, and then to the subcooling evaporator coil 60F. The ambient air condenser 88 in turn is cooled by conventional fans 90. The dehumidification system of the conditioner 50 preferably is of the refrigerant dehumidification type, which simultaneously cools the air and lowers the temperature of the air to below its dew point so that water vapor in the air collects on the condenser coils as water droplets (or alternatively as ice crystals), and is removed by condensate line 61. The compressor 92 is regulated by the controller 84 in response to the temperature and humidity sensors 74 and 76. The flow rate of the Freon or other refrigerant through the subcooling evaporator coil 60F may be controlled by the cross-charged expansion valve 86, which in turn is regulated by an air temperature sensor 85 which monitors the outlet air temperature from the evaporator coil 60F.

The refrigerant based dehumidification system may include additional control mechanisms for recapturing and returning heat to the conditioned air which was removed by the evaporator coil 60F. The amount of refrigerant circulated to the reheat coil 62F is thus controlled by the bypass valves 97 and 98. As previously noted, the ambient air condenser 88 acts to reject the residual heat from the refrigerant before it enters the expansion valve. The cooling fan 90 circulate ambient air through the condenser 88 in a conventional manner, and the activation of the fan 90 is controlled by the level of refrigerant pressure to the evaporator coil 60F. Compressor 92 is of the type which can operate either at half or full capacity, and the capacity of the compressor 92 is changed to prevent icing on the evaporator coil and reduce power consumption. If a recapture and reheat system is not provided, a conventional electrical or gas power heating unit 63 may be employed for heating the air prior to its return to the working area. The heating unit 63 may not be necessary for many asbestos removal operations conducted in Southern climates, but will have practical value in Northern climates when asbestos removal operations are conducted in winter months.

The system of the present invention may also include a closed loop glycol/water system separate from the refrigeration system. FIG. 3 thus depicts a precooling evaporator coil 60G and a reheat coil 62G both within a glycol/water closed loop system which is pressurized by pump 96. The glycol/water system further increases the efficiency of the recapture and reheat system. As a further alternative to the embodiment depicted in FIG. 3, the low pressure refrigerant from the evaporating coil 60F may be charged by compressor 92, and may then be passed through a glycol/water heat exchanger (not shown) where excess heat is transferred to the glycol solution, then used to reheat the air prior to reentering the enclosed space.

In a typical application, the controller 84 will operate the air conditioning unit 50 to maintain a dry bulb temperature within the working area in the range of from 60° to 78°, and will maintain a desired humidity level within the working area. By maintaining a high humidity level within the working area during wet abatement operations, the airborne contaminant level may be minimized. A low humidity level will not only contribute to the comfort of the operator, but will substantially reduce the drying or curing time for aqueous solutions being sprayed within the working area, as previously explained. For an exemplary 30,000 cubic foot working zone, the cooling system of the air conditioning unit 50 is preferably sized to remove from 30,000 to 42,000 BTU of heat from the returned air per hour, while the dehumidification system is preferably sized to remove from 44,000 to 64,000 BTU of heat per hour. From the above, it should thus be apparent that a majority of the energy consumed by the unit 10 is attributable to the dehumidification system, and that a substantially reduced energy level would be required if one planned to cool the filtered air to a desired temperature, but did not intend to reduce the humidity level within the working space. The size of the heating system will largely depend on the location of the unit, but generally the heating system may be sized to input from 15,000 to 30,000 BTU of heat per hour to the working space. It is apparent that larger working zones will require correspondingly larger capacity conditioning units or multiple units operating in parallel.

It should be understood that the various components of the apparatus of the present invention may be selected from a variety of manufactures, and will largely depend upon the anticipated ambient temperature and humidity conditions, the amount of spraying anticipated within the working area, and the selected comfort level for the workers. By way of illustration, the components described above are listed by a suitable model number and manufacture for one embodiment of the present invention.

| Component | Model No. | Manufacturer | Manufacturer Location |
|---|---|---|---|
| Blower 46 | 4C252 | Dayton | Dayton, OH |
| Conditioning Unit 50 | EA-E1 | Enviro-Air Inc. | Houston, TX |
| Diverter 58 | EA-D1 | Enviro-Air Inc. | Houston, TX |
| Blower 64 (Optional component of unit 50) | 4C252 | Dayton | Dayton, OH |
| Air Pressure Sensor 72 | C264 | SETRA | Acton, MA |
| Temperature Sensor 74 | A-72 | Johnson | Houston, TX |
| Humidity Sensor 76 | 2 E741 | Ranco | Plain City, OH |
| Controller 82 | | | |
| (Optional component of unit 50) | MIC 2000 | Partlow | New Hartford, NY |
| | M744-S | Honeywell | Golden Valley, MN |

Apart from the selection of suitable components of the apparatus of the present invention, other modifications from the foregoing disclosure should now be apparent. By way of example, a plurality of "negative air units" may be positioned within the enclosed space to maintain a desired air flow within the enclosed space, with the intake and exhaust from each of these units contained within the working space, as disclosed in U.S. Pat. No. 4,801,312. Also, a filtration unit and blower of a negative air unit may be separate from the conditioning unit 50. In this case, the filter unit 44 and blower 46 could be regulated to maintain the desired negative pressure within the working space by discharging air outside the building, while the conditioning unit 50, including blower 64, received all its air directly from the working area, with a filter unit or filter and blower unit upstream from the conditioning unit 50. In this latter case, a restricter unit may be provided to restrict the opening of the intake to the air conditioning unit 50, and thereby effectively control the amount of returned air in response to the sensed negative pressure. An employee decontamination unit 83 is preferably utilized to minimize the amount of leakage air into the working area, and all of the walls which define the working area may be permanent walls already within the building. Alternatively, temporary walls may be formed, either from standard buildings materials, such as plywood or sheet rock, or utilizing plastic sheets or flat seals.

As previously noted, the method and apparatus of the present invention may also be used to remove asbestos from outdoor structures. In a typical application, asbestos may be covering an outdoor tank or a series of pipes elevated on a conventional pipe rack. The tank or a section of the pipe lines may be covered with plastic sheeting held in place by a temporary wooden frame to define an enclosed working space which houses the outdoor structure or portion of pipe rack. The temperature and humidity within the defined working space may be controlled in a manner described above by using the portable unit 10.

The techniques of the present invention may also be used to remove lead-based paint from an outdoor structure, such as a bridge. Again, either a section or the entirety of the structure is enclosed by a temporary barrier, and a negative pressure is preferably maintained within the working space to prevent contamination of adjacent equipment, land, buildings, etc. A sand blast operator within the enclosed working space removes the hazardous lead-based paint by a conventional blasting operation, which may either be a wet blasting or dry blasting process. The temperature and the humidity within the working space may be controlled by the system 10 described above. The apparatus 10 may also be used to maintain a controlled working environment for a blasting operator removing lead-based paint from a defined enclosed area within a building.

The foregoing disclosure and description of the invention are thus illustrative and explanatory of the techniques of the present invention, and various other changes in the equipment as well as the described methods may be made within the scope of the appended claims and without departing from the spirit of the invention.

What is claimed is:

1. A method of providing an improved temporary working environment during removal or encapsulation of hazardous particulate material from a working space substantially sealed from space exterior of the working space, the method comprising:

powering one or more portable air moving units for exhausting air including hazardous particulate material from the defined working space and maintaining a negative pressure within the working space with respect to the space external of the working space;

monitoring the level of negative pressure within the working space;

filtering the exhausted air to remove the hazardous particulate material;

discharging a first portion of the exhausted air to the space exterior of the working space;

powering a portable conditioning unit to condition a second portion of the exhausted air, the second portion of the exhausted air being defined by the exhausted air less the discharged air;

returning the conditioned air to the working space; and regulating the amount of the first portion of the exhausted air in response to the monitored level of negative pressure.

2. The method as defined in claim 1, further comprising:

positioning one of the portable air moving units for drawing air from the working space through the portable conditioning unit and discharging conditioned air to the working space.

3. The method as defined in claim 1, wherein the step of powering the conditioning unit to condition the air comprises:

powering a portable air cooling unit to cool the second portion of the exhausted air; and dehumidifying the second portion of the exhausted air to remove water and reduce the humidity level within the working space;

4. The method as defined in claim 3, further comprising:

the step of dehumidifying the second portion of the exhausted air includes cooling the air to a temperature below its dew point to generate condensate from water vapor within the air conditioning unit; and spraying the condensate within the working space against the hazardous particulate material.

5. The method as defined in claim 3, further comprising:

the step of dehumidifying the second portion of the exhausted air includes cooling the air to a temperature below its dew point to generate condensate from water vapor within the air conditioning unit; and spraying the condensate within the conditioned air to increase the humidity levels within the working space.

6. The method as defined in claim 3, further comprising:

monitoring the temperature of air within the working space;

monitoring the humidity level of air within the working space; and controlling the operation of the portable air conditioning unit in response to the monitored temperature and humidity levels.

7. The method as defined in claim 1, wherein the step of regulating the amount of the first portion of the exhausted air comprises:

providing a movable air diverter for dividing the exhausted air into a discharged air stream and a conditioned air stream;

powering a drive unit for controlling movement at the diverter; and automatically regulating operation of the drive unit in response to the monitored level of negative pressure within the working space.

8. The method as defined in claim 1, further comprising:

automatically and continuously comparing the monitored negative pressure level with a predetermined safety pressure level; and automatically terminating operation of the one or more portable air moving units if the monitored negative pressure level is greater than the predetermined safety pressure level.

9. The method as defined in claim 1, wherein the step of powering the conditioning unit to condition the air comprises:

heating the second portion of the exhausted air prior to returning the conditioned air to the working space.

10. The method as defined in claim 1, wherein the step of defining the working space comprises:

defining the working space within a portion of a building; and sealing the working space from other space within the building such that less than 1% of the volume of the working space per minute leaks into the working space from the space external of the working space while negative pressure is maintained within the working space.

11. The method as defined in claim 10, further comprising:

filtering the exhausted air at a position upstream from the portable air moving unit, such that both the discharged air and the conditioned air are filtered; and discharging the first portion of the exhausted air outside the building.

12. An apparatus for improving the working environment of a working space substantially sealed from space external of the working space during hazardous particulate material abatement operations, the apparatus comprising:

a portable air moving unit for exhausting air including hazardous particulate material from the working space and maintaining a negative pressure within the working space with respect to the space external of the working space;

pressure sensing means for monitoring the level of negative pressure within the working space;

a filter unit for filtering the exhausted air to remove the hazardous particulate material;

a discharge duct for discharging a first portion of the filtered exhausted air to the space exterior of the working space;

a portable conditioning unit for conditioning a second portion of the exhausted air, the second portion of the exhausted air being defined by the exhausted air less the discharged air;

a return duct for returning the conditioned air to the working space; and air discharge control means for regulating the amount of the first portion of the exhausted air in response to the pressure sensing means.

13. The method as defined in claim 12, further comprising:

another portable air moving unit downstream of the portable air conditioning unit for pulling air through the air conditioning unit and discharging conditioned air into the working space.

14. The method as defined in claim 12, wherein the portable air conditioning unit comprises:

a refrigeration unit including a refrigerant compressor, and expansion chamber, and an evaporation coil; and a refrigerant dehumidification unit for lowering the air temperature to below its dew point to generate condensate from the exhausted air.

15. The method as defined in claim 14, further comprising:

spraying means for spraying the condensate within the working space and against the hazardous particulate material.

16. The method as defined in claim 12, further comprising:

a temperature sensing unit for monitoring the temperature of air within the working space;

a humidity sensing unit for monitoring the humidity level of air within the working space; and a control unit for controlling operation for the portable air conditioning unit in response to the temperature sensing unit and the humidity sensing unit.

17. The method as defined in claim 12, further comprising:

a drive unit for controlling operation of the air discharge control means; and a drive control unit for automatically regulating the operation of the drive unit in response to the pressure sensing means.

18. The method as defined in claim 12, further comprising:

a worker decontamination area external of and adjoining the working area, the decontamination area including wall means for substantially sealing the decontamination area from the environment external of the decontamination area, a shower area, a changing area, an entry door for worker access into the worker decontamination area, and an exit door for worker access from the decontamination area into the working area.

19. The method as defined in claim 12, further comprising:

the working space in part being defined by permanent walls of a building;

one or more permanent air ventilation ducts within the building for normally circulating air within the working space; and sealing means for preventing air movement between the one or more air ventilation ducts and the working space.

20. The method as defined in claim 12, wherein the portable conditioning unit further comprises:

a heating unit for heating the conditioned air.

* * * * *

UNITED STATES PATENT AND TRADEMARK OFFICE

CERTIFICATE OF CORRECTION

PATENT NO. : 5,090,972

DATED : February 25, 1992

INVENTOR(S) : Joe C. Eller et al

It is certified that error appears in the above-identified patent and that said Letters Patent is hereby corrected as shown below:

In Column 15, line 18, change "levels" to --level--.

In Column 16, line 32, change "method" to --apparatus--.

In Column 16, line 38, change "method" to --apparatus--.

In Column 16, line 46, change "method" to --apparatus--.

In Column 16, line 51, change "method" to --apparatus--.

In Column 16, line 60, change "method" to --apparatus--.

In Column 16, line 67, change "method" to --apparatus--.

In Column 17, line 11, change "method" to --apparatus--.

In Column 18, line 9, change "method" to --apparatus--.

Signed and Sealed this

Twenty-fifth Day of May, 1993

*Attest:*

Michael K. Kirk

MICHAEL K. KIRK

*Attesting Officer*

*Acting Commissioner of Patents and Trademarks*